US00RE39178E

(19) United States
(12) Reissued Patent
Allen

(10) Patent Number: US RE39,178 E
(45) Date of Reissued Patent: Jul. 11, 2006

(54) OVERSIZE METAL WOOD WITH POWER SHAFT

(75) Inventor: Dillis V. Allen, Elgin, IL (US)

(73) Assignee: Vardon Golf Company, Inc., Schaumburg, IL (US)

(21) Appl. No.: 09/567,180

(22) Filed: May 5, 2000

Related U.S. Patent Documents

Reissue of:
(64) Patent No.: 5,873,791
Issued: Feb. 23, 1999
Appl. No.: 08/859,282
Filed: May 19, 1997

(51) Int. Cl.
*A63B 53/04* (2006.01)
*A63B 53/08* (2006.01)

(52) U.S. Cl. ..... 473/287; 473/332; 473/336; 473/346; 473/350; 473/309; 473/291

(58) Field of Classification Search ..... 473/288, 473/305, 336, 311, 346, 345, 350, 332, 309, 473/337, 287, 290, 291, 342
See application file for complete search history.

(56) References Cited

U.S. PATENT DOCUMENTS 3,637,218 A * 1/1972 Carlino
4,958,834 A * 9/1990 Colbert
5,228,615 A * 7/1993 Iijima
5,242,167 A * 9/1993 Antonious
5,362,047 A * 11/1994 Shaw
5,362,055 A * 11/1994 Rennie
RE34,925 E * 5/1995 McKeighen
5,464,211 A * 11/1995 Atkins
5,586,948 A * 12/1996 Mick
5,611,742 A * 3/1997 Kobayashi
5,630,888 A * 5/1997 Yoshida
5,632,695 A * 5/1997 Hlinka
5,890,973 A * 4/1999 Gamble

FOREIGN PATENT DOCUMENTS

GB 2225726 * 6/1990

* cited by examiner

*Primary Examiner*—Stephen Blau
(74) *Attorney, Agent, or Firm*—Dillis V. Allen, Esq.

(57) ABSTRACT

A wood-type golf club having an enlarged club head in the range of 250 to 300 cm.$^3$ constructed of a material lighter than steel to maintain the total club head weight within normal limits including the weight of novel power shaft according to the present invention. The club head, without the power shaft, is approximately 175 gms. and the power shaft weighs approximately 25 gms., so the total club head weight is approximately 200 gms. and within normal limits. The power shaft, integral with the rear of the ball striking face wall at its forward end and integral or cast into the rear of the club head at its rear end, while reinforcing the ball striking face wall, increases the resonant frequency of the face wall to synchronize face wall rebound to the player's swing speed. Face wall resonant frequency is varied by changing the size and weight of the power shaft.

26 Claims, 6 Drawing Sheets

OVERSIZE METAL WOOD WITH POWER SHAFT

Matter enclosed in heavy brackets [ ] appears in the original patent but forms no part of this reissue specification; matter printed in italics indicates the additions made by reissue.

BACKGROUND OF THE PRESENT INVENTION

Investment casting techniques innovated in the late 1960s have revolutionized the design, construction and performance of golf club heads up to the present time. Initially only novelty putters and irons were investment cast, and it was only until the early years of the 1980s that investment cast metal woods achieved any degree of commercial success. The initial iron club heads that were investment cast in the very late 1960s and early 1970s innovated the cavity backed club heads made possible by investment casting which enabled the molder and tool designer to form rather severe surface changes in the tooling that were not possible in prior manufacturing techniques for irons which were predominantly at that time forgings. The forging technology was expensive because of the repetition of forging impacts and the necessity for progressive tooling that rendered the forging process considerably more expensive than the investment casting process and that distinction is true today although there have been recent techniques in forging technology to increase the severity of surface contours albeit them at considerable expense.

The investment casting process, sometimes known as the lost wax process, permits the casting of complex shapes found beneficial in golf club technology, because the ceramic material of the mold is formed by dipping a wax master impression repeatedly into a ceramic slurry with drying periods in-between and with a silica coating that permits undercutting and abrupt surface changes almost without limitation since the wax is melted from the interior of the ceramic mold after complete hardening.

This process was adopted in the 1980s to manufacture "wooden" club heads and was found particularly successful because the construction of these heads requires interior undercuts and thin walls because of their stainless steel construction. The metal wood club head, in order to conform to commonly acceptable club head weights on the order of 195 to 210 gms. when constructed of stainless steel, must have extremely thin wall thicknesses on the order of 0.020 to 0.070 inches on the perimeter walls to a maximum of 0.125 inches on the forward wall which is the ball striking surface. This ball striking surface, even utilizing a high strength stainless steel such as 17-4, without reinforcement, must have a thickness of at least 0.125 inches to maintain its structural integrity for the high club head speed player of today who not uncommonly has speeds in the range of 100 to 150 feet per second at ball impact.

Faced with this dilemma of manufacturing a club head of adequate strength while limiting the weight of the club head in a driving metal wood in the range of 195 to 210 gms., designers have found it difficult to increase the perimeter weighting effect of the club head.

In an iron club, perimeter weighting is an easier task because for a given swing weight, iron club heads can be considerably heavier than metal woods because the iron shafts are shorter. So attempts to increase perimeter weighting over the past decade have been more successful in irons than "wooden" club heads. Since the innovation of investment casting in iron technology in the late 1960s, this technique has been utilized to increase the perimeter weighting of the club head or more particularly a redistribution of the weight of the head itself away from the hitting area to the perimeter around the hitting area, usually by providing a perimeter wall extending rearwardly from the face that results in a rear cavity behind the ball striking area. Such a club head configuration has been found over the last two plus decades to enable the average golfer, as well as the professional, to realize a more forgiving hitting area and by that we mean that somewhat off-center hits from the geometric center of the face of the club results in shots substantially the same as those hits on the center of the club. Today it is not uncommon to find a majority of professional golfers playing in any tournament with investment cast perimeter weighted irons confirming the validity of this perimeter weighting technology.

Metal woods by definition are perimeter weighted because in order to achieve the weight limitation of the club head described above with stainless steel materials, it is necessary to construct the walls of the club head very thin which necessarily produces a shell-type construction where the rearwardly extending wall extends from the perimeter of the forward ball striking wall, and this results in an inherently perimeter weighted club, not by design but by a logical requirement.

In the Raymont, U.S. Pat. No. 3,847,399 issued Nov. 12, 1974, assigned to the assignee of the present invention, a system is disclosed for increasing the perimeter weighting effect of a golf club by a pattern of reinforcing elements in the ball striking area that permits the ball striking area to be lighter than normal, enabling the designer to utilize that weight saved on the forward face by adding it to the perimeter wall and thereby enhancing perimeter weighting.

This technique devised by Mr. Raymont was adopted in the late 1980s by many tool designers of investment cast metal woods to increase the strength of the forward face of the metal woods to maintain the requirement for total overall head weight and to redistribute the weight to the relatively thin investment cast perimeter walls permitting these walls to not only have greater structural integrity and provide easier molding and less rejects, but also to enhance the perimeter weighting of these metal woods.

Another problem addressed by the present invention is the achievement of increasing the benefits of perimeter weighting by simply adding weight to the perimeter of the club head itself. This technique, of course, has found considerable success in low impact club heads such as putters, where overall club head weight is in no way critical, and in fact in many low impact clubs that have found considerable commercial success, the club heads weigh many times that of metal wood heads, sometimes three or four times as heavy.

To this date, however, increased perimeter weighting has not been found easy because of the weight and impact strength requirements in metal woods. An understanding of perimeter weighting must necessarily include a discussion of the parameter radius of gyration. The radius of gyration in a golf club head is defined as the radius from the geometric or ball striking axis of the club along the club face to points of club head mass under consideration. Thus, in effect the radius of gyration is the moment arm or torquing arm for a given mass under consideration about the ball striking point. The total moments acting on the ball during impact is defined as the sum of the individual masses multiplied by their moment arms or "radii of gyration". And this sum of the moments can be increased then by either increasing the length of the individual moment arms or by increasing the mass or face acting at that moment arm or combinations of the two.

Since it is not practical, except for the techniques discussed in the above Raymont and Allen patents, to add weight to the perimeter wall because of the weight limitations of metal woods and particularly the driving woods, one alternative is to increase the moment arm or radius of gyration. This explains the popularity of today's "jumbo" woods although many of such woods do not have enlarged faces because of the requirement for structural integrity in the front face.

In the Allen, U.S. Pat. No. 5,397,126, an improved metal wood golf club is provided having an enlarged or "jumbo" metal club head with a crowned top wall extending rearwardly from a ball striking face wall, a toe wall, and a heel wall also projecting rearwardly from the face wall—but the club head has no conventional sole plate.

The toe wall and the heel wall are enclosed by the top wall and a pair of spaced generally vertical weighting walls integral with and extending rearwardly from the face wall. The two areas enclosed by the top wall, heel and toe walls, and weight walls are hollow to achieve the desired head weight and the area between the walls is opened, and the weight of the sole plate that normally encloses the area is redistributed to the weight wall to achieve true heel and toe weighting.

Prior attempts to manufacture very large stainless steel metal club heads with larger than normal faces has proved exceedingly difficult because of the 195 to 210 gm. weight requirements for driving club heads to achieve the most desirable club swing weights. Thus, to the present date stainless steel "jumbo" club heads have been manufactured with standard sized face walls, deeply descending top walls from the front to the rear of the club head, and angular faceted sole plates all designed to decrease the gross enclosed volume of the head but which do not detract from the apparent, not actual, volumetric size of the head. This has led to several manufacturers switching from stainless steel to aluminum and titanium alloys, which are of course lighter, to enlarge the head as well as the face.

It is possible to enlarge not only the overall head but the face as well and at the same time increase the heel toe weighting of the head. Basically, these objectives can be achieved by a combination of a honeycomb reinforcing network formed integrally on the rear surface of the forward wall between the weighting walls and a redistribution of the weight of the conventional sole plate, which is eliminated in this design, and the weight saved on the thinner than normal face wall to the weighting walls themselves. The two enclosed areas defined by the top wall, heel and toe walls, and weighting walls are hollow, but they may be foam-filled if desired to reduce ball impact noise levels.

It has also been suggested in the past that various rods and shafts be cast or attached into the club head for the purpose of rigidifying the forward face wall. However, to the present date, such designs have not achieved any significant commercial success.

The first problem is that, while some of the prior art suggests casting the rods with the forward face, as a practical matter this has never been achieved because of the extreme difficulty in removing the core pieces around the shaft due to interference with the walls of the club head.

A second problem that is not addressed in this prior art is that in order to be effective in reinforcing the front face, the shafts need to be integrated into the club head. The shaft must also have a weight in the range of 20 to 30 gms. If one simply adds 20 to 30 gram element to a 200 gm. head, the resulting weight of 220 to 230 gms. is excessive and will result in a swing weight far higher than acceptable to the present day average golfer.

An additional problem in many of these prior rigidifying elements is that they are constructed of a low modulus material such as plastic or graphite compositions. These materials do not significantly increase the resonant frequency or the rebound of the face wall. Ideally, the rebound of the face wall; that is, the return of the face wall to its relaxed configuration, should occur at approximately the time the ball exits the face wall contact. In this way the rebound of the face wall assists in propelling the ball from the club face. If rebound occurs after the ball exits the face wall, the benefits of this effect are completely lost. None of the prior art dealing with these reinforcing elements suggests utilizing this technique for matching face wall rebound with ball exit from the face wall.

A further problem in the prior art references which suggest utilizing these rigidifying elements, is that they are completely silent on how these reinforcing elements, when not cast into the face wall, are attached into the club head. And the method of attachment, as will be seen from the present invention, is critical to the benefits of increasing resonant frequency and rebound of the face wall in accordance with the present invention. Presently known bonding techniques are not sufficient to yield these benefits.

Still another of these prior references suggests making the head of synthetic material and the support rod of a similar material, but these low modulus and soft materials cannot significantly raise the resonant frequency or rebound time of the ball striking face wall.

The following patents or specifications disclose club heads containing face reinforcing elements:

FOREIGN PATENTS

British Patent Specification, No. 398,643, to Squire, issued Sep. 21, 1933;

UNITED STATES PATENTS

Clark, No. 769,939, issued Sep. 13, 1904
Palmer, No. 1,167,106, issued Jan. 4, 1916
Barnes, No. 1,546,612, issued Jul. 21, 1925
Drevitson, No. 1,678,637, issued Jul. 31, 1928
Weiskoff, No. 1,907,134, issued May 2, 1933
Schaffer, No. 2,460,435, issued Feb. 1, 1949
Chancellor, No. 3,589,731, issued Jun. 29, 1971
Glover, No. 3,692,306, issued Sep. 19, 1972
Zebelean, No. 4,214,754, issued Jul. 29, 1980
Yamada, No. 4,535,990, issued Aug. 20, 1985
Chen, et al., No. 4,681,321, issued Jul. 21, 1987
Kobayashi, No. 4,732,389, issued Mar. 22, 1988
Shearer, No. 4,944,515, issued Jul. 31, 1990
Shiotani, et al., No. 4,988,104, issued Jan. 29, 1991
Ducios, No. 5,176,383, issued Jan. 5, 1993
Atkins, No. 5,464,211, issued Nov. 7, 1995
Rigal, et al., No. 5,547,427, issued Aug. 20, 1996

In the Squire British Specification 398,643, the reinforcing rods 10 and 18 are primarily for the purpose of reducing ringing in the face. Squire makes no attempt to maintain head weight within acceptable limits and is completely silent on how the rod 10 can be cast inside the head while removing the core pieces therefrom. Squire is also silent on the rebound or resonant frequency on the head.

The Clark, U.S. Pat. No. 769,939, shows a movable rod that assists in propelling the ball from the club face.

The Palmer, U.S. Pat. No. 1,167,106 shows a weighting element that does not extend completely through the club head.

The Barnes, U.S. Pat. No. 1,546,612, shows rods 13 and 14 extending into the club head, but these rods are for attachment purposes of the face 10 and the club is not a perimeter weighted club.

The Drevitson, U.S. Pat. No. 1,678,637, shows reinforcing partitions 55, but these are not concentrated directly behind the ball striking area, and thus, while rigidifying the face, do not concentrate mass transfer directly to the ball.

The Weiskoff, U.S. Pat. No. 1,907,134, shows a reinforcing member near the center of the club face, but such is not concentrated specifically in the ball striking area and is not a high modulus material.

The Schaffer, U.S. Pat. No. 2,460,435, shows a labyrinth of webs molded in the club head, but the club head is not a high modulus material, nor is the club face and the core 11 is aluminum and not constructed of the same material as the club head.

The Chancellor, U.S. Pat. No. 3,589,731, shows a movable weight between the back and the front of the club that allegedly corrects hooking and slicing.

The Glover, U.S. Pat. No. 3,692,306, shows a weight port integral with the club face in FIG. 6, but Glover's club head is a low modulus resin and is not perimeter weighted.

The Zebelean, U.S. Pat. No. 4,214,754, shows support members 32 in FIG. 10, but they are not connected to the face nor are they concentrated behind the sweet spot.

The Yamada, U.S. Pat. No. 4,535,990, shows a shaft between the rear of the face wall and a back portion of the club, but the Yamada club head is not a high modulus material, and the patent is silent as to how the reinforcement member 31 is connected into the club head cavity.

The Chen, et al., U.S. Pat. No. 4,681,321, shows webs 31 molded inside the club head, but both the club head and the webs are low modulus materials.

The Kabayashi, U.S. Pat. No. 4,732,389, shows a brass plate and a rod that engage the rear of the ball striking face, but the patent is silent as to how it is attached to the face and the club head is solid wood and not a perimeter weighted club head.

The Shearer, U.S. Pat. No. 4,944,515, shows a shaft 24 either cast or attached inside the club head. The Sheer patent is silent as to how the shaft could be cast in the club head and in the alternative suggests that it be fixed in after the club head is made, the patent is silent as to how it might be fixed inside.

The Shiotani, et al., U.S. Pat. No. 4,988,104, shows an insert 15 that is insert molded inside the golf club head, but the club head is a resin type low modulus material, and there is no specific attachment of the insert into the head other than that which results from the insert molding process.

The Ducios, U.S. Pat. No. 5,176,383, discloses a low modulus graphite head having a rod formed on the rear of the ball striking face. The low modulus head provides the Ducios club with minimal perimeter weighting.

The Atkins, U.S. Pat. No. 5,464,211, shows a plate 30 that is threaded from the rear of the club against the forward face which he refers to as a "jack screw". The plate 30 is epoxied to the rear of the face wall and such a design will fail under the extreme high impact loadings of a 150 ft./sec. impact with a golf ball.

The Rigal, et al., U.S. Pat. No. 5,547,427, shows partitions. In the FIG. 9 embodiment, the rod 74 is placed in tension which detracts from rigidifying the front face. In the FIG. 10 embodiment, the rod 23 is not integral with the front face.

A further principle problem addressed in the present invention has resulted from the use of light-weight alloys to "jumbo" or oversized metal woods that are particularly popular is today's golfing market. As noted above, these use light-weight metals such as high titanium alloys that permit the clubhead to be made larger, providing increased perimeter weighting and an easier to hit larger sweet spot. However, there is a trade-off to this large sweet spot and that is a diminution in ball distance travel or in short, the ball does not travel as far as it does with smaller stainless steel heads, which concentrate more mass behind the ball. This in part explains why professionals on the regular tour rarely use very large titanium clubheads.

This diminution in ball distance in jumbo titanium alloys, or other light-weight alloy heads, is believed caused by two factors. First, the very large clubheads spread the perimeter wall support points from the ball striking area, causing the face to flex more than smaller heads resulting in a badly delayed rebound of the face. Secondly, while titanium is a hard material, it has a modulus of elasticity less than half that of ferrous alloys.

It should be noted that today's high titanium alloy jumbo metal wood heads having volumes in the range of 250 to 300 $cm.^3$, have relatively thin wall thickness, less than 0.125, and in some cases substantially less than 0.125 inches, which exacerbates the problem of face flexure and slow face rebound. The decrease in ball distance travel in these clubs is believed due in part to an incomplete face recovery during ball impact. That is, the club bends inwardly at ball impact and then returns to its normal relaxed position. The rebound of the club face, or its returns to its relaxed position, should assist in propelling the ball from the clubface. In these high titanium jumbo clubheads however, the face wall does not fully recover until after the ball leaves the club face, thereby dissipating as waste a portion of the clubhead energy.

If one can imagine a fixed flat board supported at points two feet apart and second board supported at points 10 feet apart, both with a 200 lb. weight in the middle of the board, the second board will bend a great amount more. This is what causes in part the greater face flexure in the jumbo metal woods.

And while titanium is perceived as an extremely strong material, it is only strong in the sense that it has a high surface hardness. Actually, its resistance to flexure; i.e., its modulus of elasticity, is less than half that of the ferrous alloys such as stainless steel. Thus, in addition to the widely spaced supports described above, increased face flexure of these clubheads at ball impact attributed to its modulus, both contribute to a late face recovery.

Other objects and advantages of the present invention will appear more clearly from the following detailed description.

SUMMARY OF THE PRESENT INVENTION

According to the present invention, a high modulus golf club head of the "wood" type is provided with a power shaft, a rod for increasing the resonant frequency and decreasing the rebound time of the face, integral at its forward end with the ball striking wall behind the sweet spot and integral with a rear portion of the club head at its rear end. While others have attempted supports for other purposes such as face reinforcement and club sound or feel, they have not been successful because these clubs are either not possible to manufacture, or will fail under the rigors of a 100 to 150 ft./sec. impact velocity against a golf ball.

A primary provision of the present invention is a jumbo clubhead in the range of 250 to 300 cm.$^3$ constructed of a hard, light-weight alloy such as titanium or beryllium, with an integral power shaft extending from behind the club face sweet spot to a rear portion of the club head.

Toward these ends, the power shaft according to the present invention is constructed of a metal alloy substantially similar to the metal alloy of the club head so it may be welded or fixed integrally to the sweet spot on the rear of the face wall and cast welded or fixed integrally to a rear portion of the club head at its rear end. While welding similar metals is certainly not a new concept, it is not possible to weld, for example, a 0.625 inch diameter shaft with a 0.035 to 0.049 inch wall thickness directly to the club head face wall and rear wall because the face wall and rear wall, because of their large areas, require higher heating and welding temperatures resulting in heat distortion of the face wall and rear clubhead.

To obviate this problem, the face wall sweet spot and the rear club head portion have cast in annular retainer walls to which the power shaft is welded. These retainers buff the heat sink effect of the face wall and club head portion and minimize heat distortion in these surfaces during welding.

The power shaft according to the present invention is a compromise between club head designs to enhance perimeter weighting and increase the sweet spot area, and the ball distance producing designs that concentrate more mass directly behind the ball at impact. Larger club heads that are constructed of thin or light walls are far easier for the average golfer to hit consistently with off center hits because the mass or walls of the club head are spread out further from the geometric center or ball striking area on the club head wall face. This design increases what is termed the radius of gyration of the club head by golf club engineers. In short, this concept tells the engineers that the further one defines the walls of the club head away from the center of the face, the larger the effective hitting area or sweet spot on the club face. This makes this design approach extremely attractive to the average golfer, but not necessarily the stronger and low handicap players because there is a trade off with ball distance, which decreases generally speaking, with larger perimeter weighted heads.

Why? Because in order to keep total club head weight in a driver, for example at about 195 to 205 grams and at the same time make an oversized club head to increase perimeter weighting, the club face must be relatively thin and since it is larger than standard, it deforms more upon impact which, absent frequency matching techniques, will decrease ball distance travel.

Hence, the compromise between increased radius of gyration and increased ball distance to which the present invention is directed. The ideal long driving club is not perimeter weighted, it is instead a solid brass rod having the diameter of a U.S. quarter and a length of four inches with a shaft aligned so the long driver hits the ball with one end of the brass rod. This design concentrates 100% of the mass of the club head on the flattened rear surface of the ball at impact.

This is the ideal design for ball distance or the long ball, but even long driving professionals would not use such a club in competition because even with their skills slightly off center hits, on the order of ⅛", produce poor results. But it should be noted here that most professional long drivers do use relatively small heads to concentrate mass more closely to the center of the ball.

According to the present invention, this compromise is achieved by combining an oversize high modulus perimeter weighted metal wood of light weight material with an integrally formed power shaft of similar material. It is possible to form this design in stainless steel with a density of about 8 grams per cm$^3$ but is very difficult to maintain total clubhead weight under 225 grams if volume exceeds 220 cm.$^3$, which is somewhat above the ideal for the average golfer; e.g., 200 grams. A stainless steel club has been produced, according to the principles of the present invention, with 208 grams in stainless steel, a volume of about 230 cm$^3$ and a power shaft 2⅛" long, 0.625" OD and with a 0.035" wall thickness.

There is a distinct advantage in embodying this design in a high titanium alloy instead of stainless steel which has a weight about 60% of stainless, on the order of 4.54 grams per cm$^3$, because the head can be made larger than 230 cms$^3$, and the power shaft can be made heavier than in stainless while maintaining total club head weight around 200 grams. Hence, the present design is particularly advantageous to club heads cast or forged in high titanium or similar alloys.

Another important aspect of the present invention is the customizing of the golf club to the swing speed of the golfer. Golfers swing speed differ radically from about 88 ft/sec. up to as much as 180/ft/sec.(123 mph). The club face at impact becomes concave and before or after the ball leaves the face, the face rebounds to its natural shape. The time the ball remains on the face is surprisingly about the same for the slow swings and the fast, but the harder swinger will compress the ball further. Ideally, for both the fast and slow swinger, the face will rebound precisely as the ball is exiting the face to enhance ball exit velocity. But to do this, bearing in mind time of impact, about 5–7 milli/sec., is about the same for all swing speeds, the face must recover at a faster rate for the high speed swing because it has a greater face deflection. To achieve this, the present line of woods gives the higher speed swinger a progressively higher face wall resonant frequency than the lower speed swing. Numerous studies have been made analoging the natural or resonant frequencies of bodies to the rebound of the bodies after bending or deformation and those have been adopted here. But it should be noted however, the natural frequency of all linear structures increases with increasing stiffness and decreases with increasing mass.

In a free body system, the natural frequency of the system f is equal to $\frac{1}{2\pi}(K)/M^{1/2}$ where f is in cycle per unit of time, of a beam pinned at both ends and center loaded, as the face of a golf club, the spring constant K; i.e., force/unit deflection at point of L and is equal to $$\frac{3\,EI}{L^3}$$

where E is the modulus of elasticity of the material, I is the moment of inertia, and L is the unsupported length.

While titanium is a very hard material, it has a relatively low modulus(E) of 16.8 psi$\times 10^{-6}$ compared to stainless steel, which is 30 psi$\times 10^{-6}$. And the natural frequency varies as $\sqrt{E}$ when E is the modulus of elasticity.

Hence, it is when equating the rebound of a titanium face to that of steel the titanium face must be stiffened significantly more and in quantified amounts, and the present invention provides the tools to do that.

As noted above while golfer swing speeds differ greatly, time of ball impact does not and total clubhead weight stays in the range of 195 to 205 grams for most all swing speeds. Thus to achieve face frequency matching to swing speed, the present invention provides a means to vary face stiffness while maintaining about the same overall head weight.

Toward this end the face wall is stiffened by selecting a power shaft of varying wall thickness, which of course are of different weight, to equate the weights, the rods are provided with transverse weight ports for high density weights, that yield the same overall weight to the clubhead but varying stiffness and natural frequency to the club face. In this way, faster face rebound is provided for the higher speed golfer and hence slower face rebound for the slower speed golfer to assure that face rebound coincides with ball exit event on the club face.

Using these philosophies, a line of relatively high modulus metal woods has been developed, and while stainless steel can be used, the choice is lighter weight alloys having a high surface hardness such as a high titanium or a high beryllium alloy. Utilizing a single club head body tool(the club head bodies are the same initially as are their face walls), the system includes a plurality of interchangeable power shafts providing increasing stiffness and resonant frequency to the ball striking wall, beginning with this walled shaft for the slower swinger and progressing to a heavy wall shaft for maximum stiffness and higher resonant frequency for the higher swing speed club.

Another important feature of the present invention is a reduced weight and higher strength hosel that enables the weight saved in the hosel to be redistributed in the form of greater perimeter weighting, larger face walls, heavier perimeter wall thickness or even heavier face wall thickness to improve the integrity of the face wall.

To achieve this result, the present hosel essentially consists of two fairly widely spaced annular bosses cast in the clubhead with the required club head walls and eliminating most of the hosel extension above the top wall of the club head. This design not only eliminates the weight of the tubular hosel between these bosses, but redistributes the club head torque on the shaft because of the widely spaced bosses compared to the concentrated torque applied to the shaft by relatively short one-piece hosels. The strength of this hosel assembly is significantly augmented by the technique of epoxying the tip end of the shaft, usually fragile graphite, into these spaced bosses. During assembly of the shaft, the tip end of the shaft is applied with pre-mixed A and B epoxy completely coating an annular surface on the tip end of the shaft from the tip to at least a point spaced from the tip end a distance equal to the maximum distance between the first and second hosel bosses. By rotating the epoxied shaft while inserting it into the bosses and changing orientation of the club while the epoxy begins to set, an epoxy sleeve can be produced on the portion of the shaft between the two annular bosses that is also bonded to the bosses to provide a lighter weighted strong bond between the upper and lower bosses.

As described above, one of the problems with today's jumbo metal woods, constructed of these walled hard alloy materials, such as titanium, is that face rebound or recovery is incomplete as the ball leaves the club face causing a portion of the head energy to be dissipated as waste, rather than being impacted to the ball. This problem is caused by the low modulus of elasticity of titanium and other materials relative to stainless steel, and the long unsupported length of the club face in jumbo metal woods.

According to the present invention, the face walls in these clubheads is caused to fully recover prior to ball impact thereby imparting more energy to the ball and increasing ball distance travel. More specifically, one primary object of the present invention is to provide a jumbo clubhead. In excess of 250 $cm^3$, constructed of thin walls, less than 0.125" in thickness, of a hard alloy with a low modulus relative to steel, with a power shaft integral with the head, that causes the face wall to rebound fully at ball impact before the ball leaves the club face.

DETAILED DESCRIPTION OF THE PREFERRED EMBODIMENT

Figure 1:
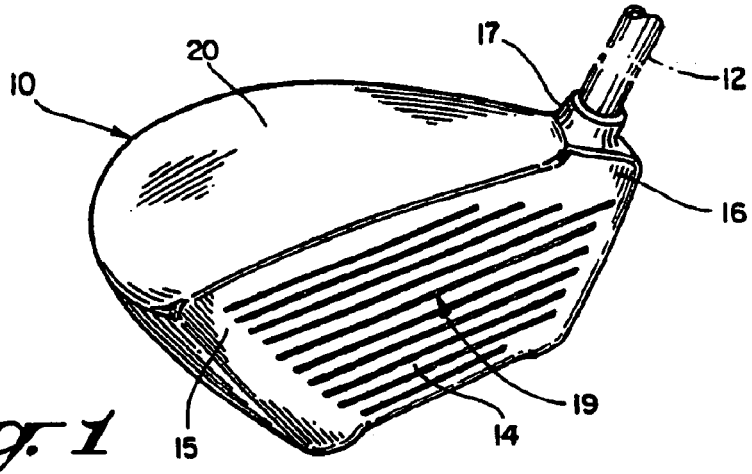
FIG. 1 is a perspective of a golf club according to the present invention having its shaft truncated.

Referring to the drawings and particularly FIGS. 1 to 8, a clubhead 10 is illustrated which takes the general configuration of what is termed a "metal wood" in the golf industry, and as seen in FIG. 1, is implanted with a shaft 12 shown only in fragmented form which carries at its upper end a conventional grip. A golf club as defined in the present invention includes a clubhead with shaft 12 fixed therein which carries the shown grip at its upper distal end.

Many of the views in the present drawings including FIGS. 2, 3, 4, 5, 6, 7, 8, 9, 10, 11, 14, 15, 16, 17, and 18 are shown approximately to scale and in fact are about 5 to 10% smaller than a 1—1 scale.

The clubhead 10 has an included volume of 260 cm.$^3$, but could range from 230 to 300 cm.$^3$. "Included" volume is defined as the volume encompassed to the outermost walls of the clubhead that includes recessed areas that are not actually enclosed by walls such as a bottom wall cavity.

The clubhead 10 is constructed entirely of a relatively high modulus castable or forgible metal alloy and is particularly best embodied in a light-weight hard surfaced alloy such as a high titanium or beryllium alloy. However, it should be understood that other alloys, for example, a 17-4 stainless steel alloy, can also be utilized with some of the features of the present invention, but the lightweight alloys such as titanium and beryllium, are better suited to achieve the desired balance between an oversized clubhead on the order of 250 to 300 cc. combined with the present power shaft to provide an overall clubhead weight, including the power shaft, in the range of 190 to 205 gms. This combination is far easier achieved with the lightweight high hardness alloys such as titanium and beryllium. Because it is an object of the present invention to achieve a high resonant frequency ball striking face, it must be understood that high titanium alloys, for example, have a relatively low modulus on the order of 14 $10^{-6}$ psi compared to some $30\times10^{-6}$ psi for the ferrous metal alloys. Since as noted above the objects of the present invention are achieved by increasing, and varying, the resonant frequency of the ball striking face of the clubhead utilizing a series of variably configured power shafts, it is necessary in the relatively lower modulus lighter metal alloys that the ball striking face be stiffened to a somewhat greater extent than is necessary in the high modulus metal alloys such as stainless steel. While at the present time the high titanium alloys are preferred by most metal wood golf club designers over stainless steel alloys, the choice is somewhat dictated by the fact that high titanium alloys weigh only 60% of the stainless steel alloys, so it is far easier for the designer to have a greater design flexibility with titanium than with stainless steel. The trade-off, however, is that very large golf club heads in titanium or similar material, while providing excellent perimeter weighting for the high handicap golfer, their low modulus compared to stainless steel, increases flexure and lowers the resonant frequency of the front face. So low that the rebound of the face is significantly delayed until after ball exit which detracts from maximum ball travel. Ball distance travel in these extremely oversized heads is also diminished because of a lack of mass concentration directly behind the hitting area which, of course, is the antithesis of what many of today's designers are attempting to achieve with exaggerated perimeter weighting.

As noted above, the present invention has its objective of providing an oversized head, and at the same time compromising the effects of perimeter weighting with the present power shaft that is positioned directly behind the ball impact area on the front face of the clubhead.

Another advantage in utilizing a light-weight alloy for the head 10 is that it permits a greater concentration of mass in the power shaft than can be achieved with the higher density alloys. That is, in a stainless steel head it is difficult to produce an oversized or jumbo head unless the weight of the power shaft is 10% or less of the weight of the remaining head; i.e., on the order of 20 gms. Utilizing a high titanium alloy, however, it is possible to increase the weight of the power shaft to as high as 25% of the weight of the remaining head, or on the order of 50 gms. This provides considerably more design flexibility in power shaft variations when utilizing high titanium alloys. However, there is a greater need for a higher weight concentration in the titanium or light-weight alloy metals simply because the front face modulus is lower in these clubheads.

Again referring to FIGS. 1 to 8, the present clubhead body 10 is seen to generally include an open area 11 as seen in FIGS. 5, 6 and 8, in which the cylindrical power shaft or tube 12 is integrally fixed.

The power shaft 12 is constructed of the same or substantially similar metal alloys as that of the clubhead 10 because the power shaft is welded at both its forward and rear end into the clubhead 10 to provide the appropriate structural integrity for not only the clubhead 10 but for reinforcing the club face and achieving the desired resonant frequency and rebound of the club face. The term "integral" as defined herein, includes welding, integral casting and press fitting. It does not include bonding with epoxy or other adhesives.

One of the purposes of the power shaft 12 is to vary the resonant frequency and the rebound of the forward face of the club for the individual player so club face rebound will apportionately coincide with the ball exit from the club face and assist in propelling the ball forwardly.

Clubhead 10 includes a forward ball striking wall 14 having an extended toe portion 15 and a heel portion 16 that extends outwardly from a hosel portion 17 in a direction opposite of ball striking area 19 on the club face. This geometry defines the hosel 17 as being an "inset" hosel in the sense that the axis of the hosel is inset toward the ball striking area 19 from the heel portion of the clubhead.

Figure 3:
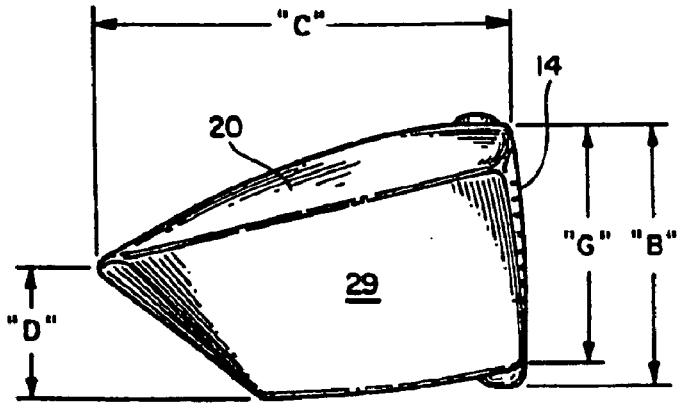
FIG. 3 is a left side view of the clubhead illustrated in FIG. 1.

A top wall 20 is formed integrally with the front face and projects rearwardly and downwardly therefrom as seen clearly in FIG. 3. Top wall 20 also wraps around the hosel and has a heel portion 21 that joins with face heel portion 16 on the side of the hosel 17 opposite the ball striking area 19, also in part defining the inset relationship of the hosel 17.

Figure 4:
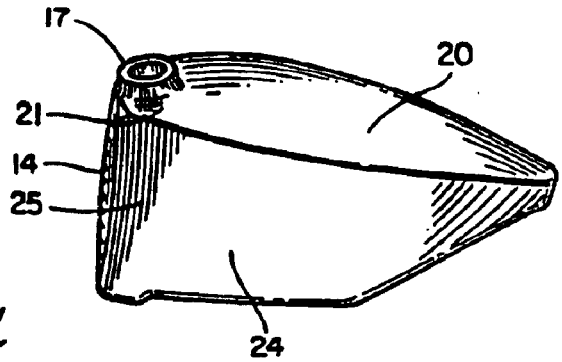
FIG. 4 is a right side view of the clubhead illustrated in FIGS. 1 to 3.

As seen in FIG. 4, a heel wall 24 is provided joined integrally with top wall 20 and face wall 24 that has a heel portion 25 that joins with the face heel portion 16 and the top wall heel portion 21 in a direction opposite hitting area 19 from the axis of hosel 17 to again define the inset relationship. It should be noted at this point that the walls of the clubhead 10, when constructed of stainless steel, are on the order of 0.050–0.070 in. in thickness except face wall 14, which is approximately 0.100 in. underneath the honeycomb reinforcement network 28 shown in FIG. 5, for example.

Figure 5:
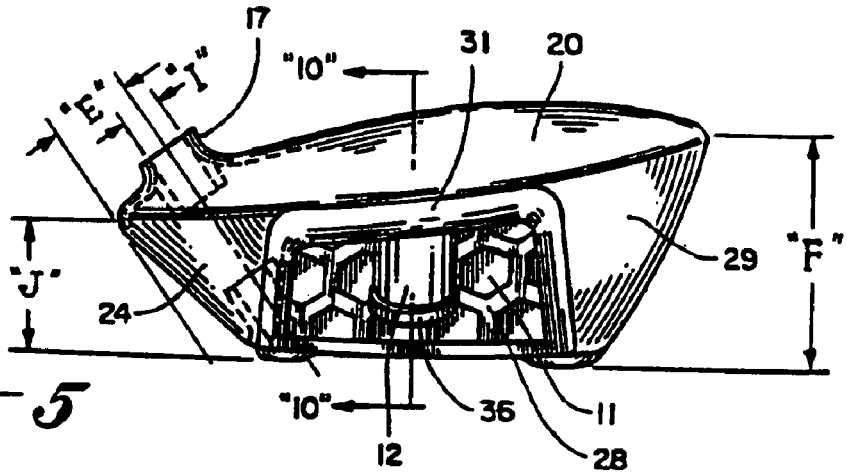
FIG. 5 is a rear view of the clubhead illustrated in FIGS. 1 to 4.

As seen in FIG. 3, a toe wall 28, formed integrally with front wall 14 and top wall 20, wraps around the top wall 20 and connects with the heel wall 24 with a narrow downwardly depending rear portion 31 shown in FIG. 5, that is integral with top wall 20.

Figure 8:
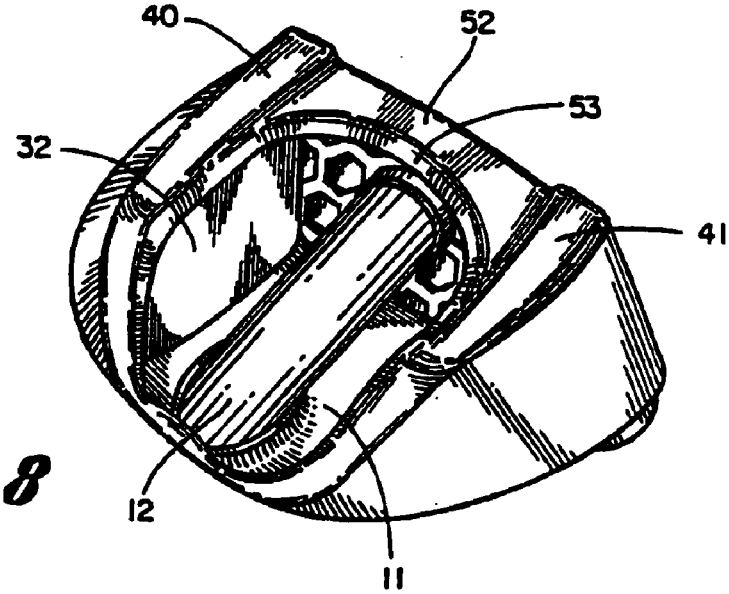
FIG. 8 is a bottom perspective of the clubhead illustrated in FIGS. 1 to 7.
Figure 9:
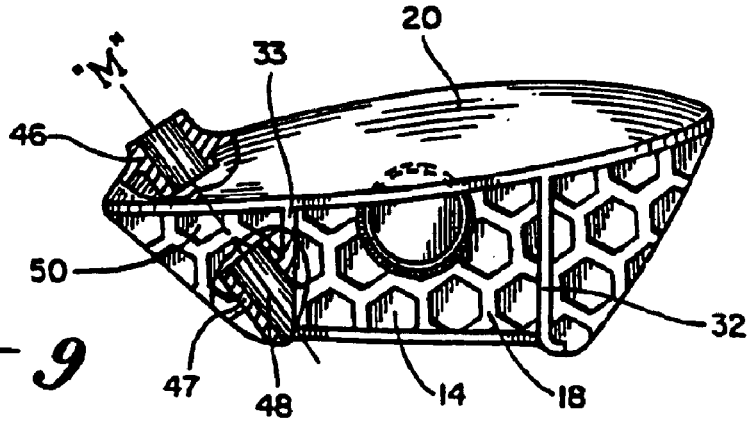
FIG. 9 is a rear view of a sub-assembly of the clubhead illustrated in FIGS. 1 to 8 with portions of its hosel shown in fragmented section.
Figure 10:
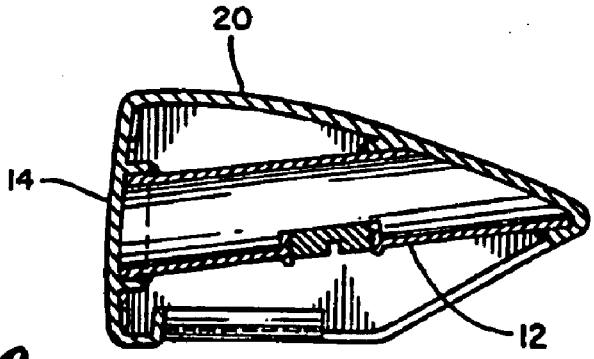
FIG. 10 is a longitudinal section through the clubhead according to the present invention taken generally along line 10—10 of FIG. 5.
Figure 11:
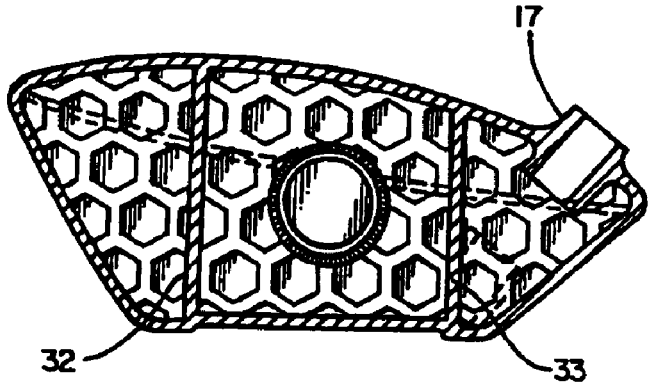
FIG. 11 is a cross-section of the clubhead illustrated in FIGS. 1–10 taken generally along line 11—11 of FIG. 2.

As seen in FIGS. 8 and 9, a toe weight wall 32 is formed integrally with face wall 14 and top wall 20 and a heel weight wall 33 is formed integrally with the front wall 14 and the top wall 20. Toe weight wall 32 is also integrally formed with toe wall 29 while heel weight wall 33 is also formed integrally with the heel wall 24, thereby defining hollow toe chambers and heel chambers similar to that described in my U.S. Pat. No. 5,397,126.

The rear surface of the face wall has an integral honeycomb structure 18 that reinforces and permits the face wall to be formed considerably thinner than normal.

Figure 2:
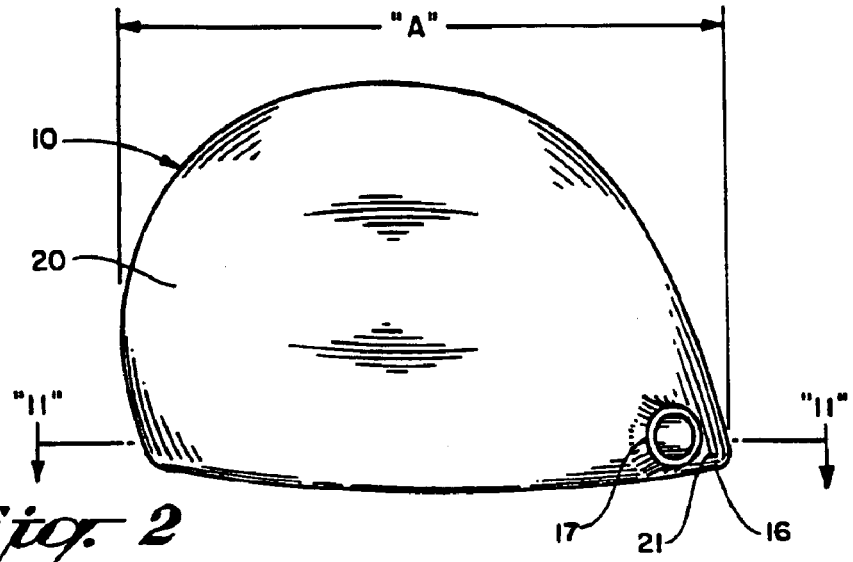
FIG. 2 is an enlarged top view of the clubhead illustrated in FIG. 1 without any shaft.

As seen in FIG. 2, the lateral total length of the clubhead 10 in a direction perpendicular to the target line is the dimension A, which according to the present invention, ranges from 4.063 in. to 4.47 in. The face wall height dimension G in FIG. 3, is 1.563 in. to 1.720 in. The total face height shown also in FIG. 3 and designated B, is 1.600 in. to 1.758 in. The rear clubhead height D, also shown in FIG. 3, ranges according to the present invention from 0.750 in. to 0.825 in. The height of the toe wall designated F in FIG. 5, ranges from 1.500 in. to 1.650 in., according to the present invention. The height of the toe wall 24 designated J, ranges from 0.875 to 0.963.

Also as seen in FIG. 5, the dimension E, which is the perpendicular distance from the axis of the hosel 17 to the furthest projection of the heel of the clubhead, ranges according to the present invention, from 0.563 in. to 0.625 in. The inside diameter of the hosel 17 is 0.334 in.

Figure 6:
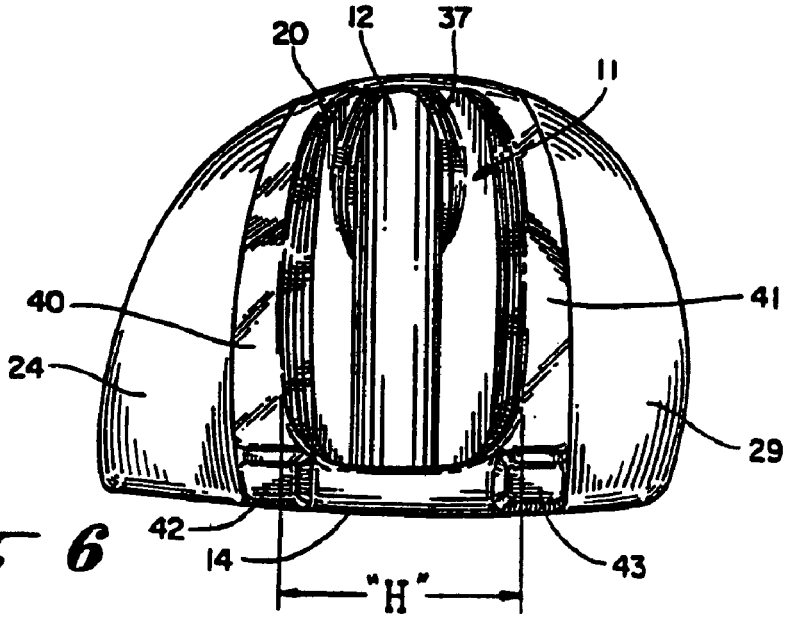
FIG. 6 is a bottom view of the clubhead illustrated in FIGS. 1 to 5.
Figure 7:
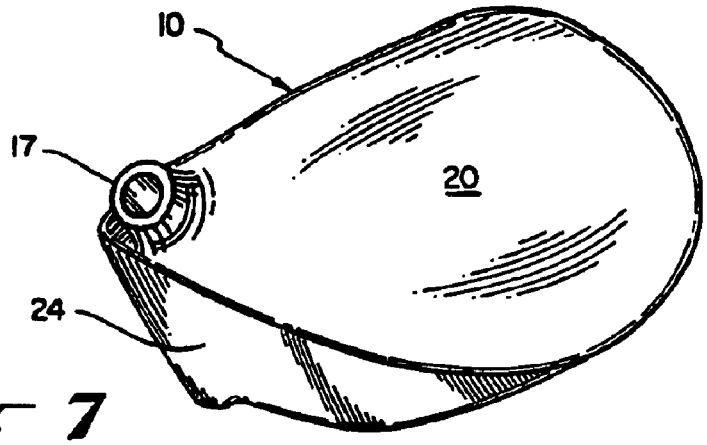
FIG. 7 is a rear perspective of the clubhead illustrated in FIGS. 1 to 6.

As seen in FIG. 6, the lateral width H of the cavity 11 in the bottom of the present clubhead, is 1.625 in.

As seen in FIGS. 5, 6 and 8, a ring or retainer 36 is formed integrally with the forward face wall 14 and has an axis coincident with the axis of the power shaft 12. The inside wall of the ring 36 is tapered rearwardly outwardly at a 3 degree angle. A second ring or retainer 37, elliptical in configuration, is formed integrally on the lower rear surface of the top wall 20 and also has an axis coincident with the axis of the power shaft 12.

An important aspect of the present invention is that the power shaft 12 is integral with the integral ring 36 at its forward end and with the rear ring 37 at its rear end, which is essential to achieving not only clubhead integrity but to achieve, the desired increase in resonant frequency of the front face 12, as well as the desired rebound characteristic of the front face. To achieve this the shaft 12 may be cast with either the face wall or the rear portion of the clubhead and then either press fitted or welded to the other part. Or the shaft can be welded, in some cases, to both.

As seen in FIG. 6, the heel wall 24 and the toe wall 29 have bottom rails 40 and 41 formed therein that serve to set the clubhead up in its proper orientation when lying on the ground. Rails 40 and 41 have pads 42 and 43 respectively at their forward ends that provide the set-up for the adjacent clubhead front wall 14. It should be understood that the volume of the present clubhead; i.e. on the order of 250–300 cc. is the outside volume of the clubhead including the volume of the open area 11. That is, the volume definition assumes that the open area is enclosed as opposed to being open as shown in the drawings. Furthermore in this regard, it should be noted that the mounting and assembly of power shaft 12 is adaptable to clubheads that have completely enclosed sole plates as opposed to the partly open sole plate arrangement of the clubhead 10 illustrated in the present drawings.

An important aspect of the present invention and as shown more clearly in the sub-assembly illustrated in FIG. 9, is that the hosel 17 includes a first annular portion 46 formed in the top wall 20 and a second lower annular portion 47, which is formed integrally with the heel weight wall 33. It should also be understood that the lower annular portion 47 could also be formed in the heel wall 24 or in the sole plate of clubs with fully formed sole plates. The annular portions 46 and 47, since they are spaced apart, at least 0.500 inches have significantly less weight than present day hosel configurations. It should also be understood that lower annular portion 47 has a through-bore 48 therethrough that opens to the lower part of the club permitting the club shaft to be extended completely therethrough during assembly.

During assembly, adhesive is applied to the club shaft and its tip inserted in both bosses 46 and 47 projecting slightly downwardly from the boss 47. The adhesive or bonding agent, usually epoxy, is extended, prior to insertion, over a sufficient length of the tip end of the shaft and the shaft is rotated as it is inserted into the bosses so that epoxy covers the shaft between the upper boss 46 and the lower boss 47 and attaches to these bosses forming a sleeve 50 around the shaft attached to both of the bosses. In essence, this defines a continuous hosel portion of rigid, hard epoxy between the upper boss 46 and the lower boss 47 of significantly reduced weight without sacrificing any structural integrity. The wide spacing between the upper annular boss 46 and the lower annular boss 47 provides less concentrated club shaft torquing than the designer normally finds in the relatively short hosels found in present day metal woods.

As seen in FIG. 8, a short forward wall 52 is formed integrally with and extends rearwardly from the lower part of the club face 14 between rails 40 and 41, and it has an upwardly extending or arcuate flange 53 that provides an "I" beam or "T" beam effect with portion 52 to support the front club face.

Figure 12:
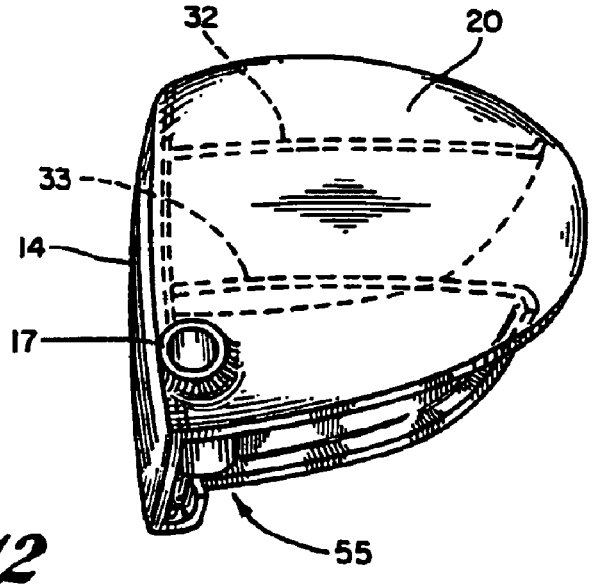
FIG. 12 is a right side top perspective view of the clubhead sub-assembly illustrated in FIG. 9.
Figure 13:
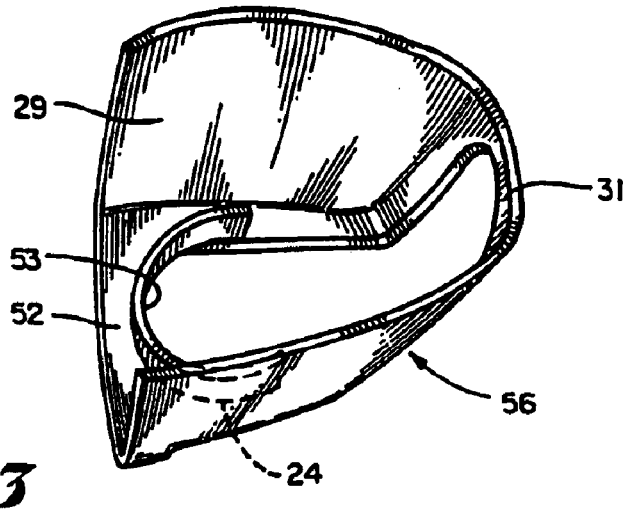
FIG. 13 is a top perspective of a rear portion sub-assembly of the clubhead illustrated in FIGS. 1 to 8.

As seen in FIGS. 12 and 13, one embodiment of the clubhead 10 can be manufactured in two parts; namely; a forward part 55 and a rear part 56. The forward part 55 includes front wall 14, top wall 20, hosel 17, toe weight wall 32, and heel weight wall 33. The rear portion 56 includes toe weight wall 29, connecting portion 31, heel weight wall 24, bottom wall portion 52, and flange 53, castings or forgings 55 and 56 are joined together by known welding techniques. It should be understood, however, that the preferred casting and assembly techniques for the present invention are illustrated in FIGS. 19, 20 and 21, as will appear more clearly hereinafter.

Figure 14:
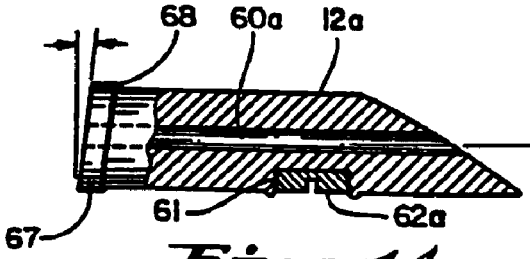
FIGS. 14 to 18 are four power shafts according to the present invention, each providing a different resonant frequency.
Figure 15:
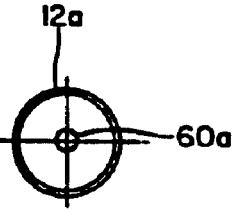
Figure 16:
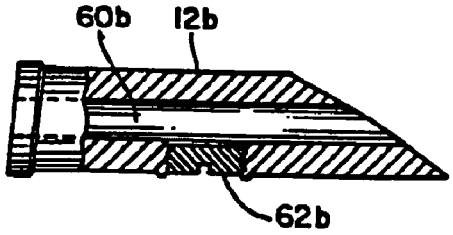
Figure 17:
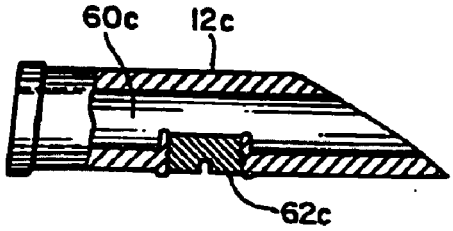
Figure 18:
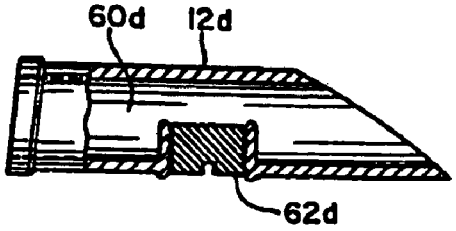

As discussed above, the power shafts, according to one embodiment of the present invention, shown as 12a, 12b, 12c and 12d, in FIGS. 14 to 18, match the rebound and a resonant frequency to the swing speed of the golfer. The power shaft 12a illustrated in FIGS. 14 and 15, is designed for the high swing speed golfer, on the order of 100 to 125 mph(ft/sec). The power shaft 12b, in FIG. 16, is designed for the 85 to 100 mph swing speed golfer; the power shaft 12c in FIG. 17 is designed for the 70 to 85 mph swing speed golfer, and the power shaft 12d in FIG. 18 is designed for the golfer having a swing speed below 70 mph(below x ft/sec). The power shafts 12a to 12d are all of equal weight. In general, the club head bodies 10 (without the power shaft 12) have a weight in the range of 150 to 180 g., the power shafts 12 have a weight in the range of 10 to 60 g., and total head weight is in the range of about 190 to 210 g. In a 190 to 205 gms. high titanium alloy head, the power shafts are all about 50 gms., or approximately 25% of the total clubhead weight. In stainless, the power shafts are 20 gms. or about 10% of total head weight. The power shafts 12a to 12d have increasing inside diameters in through passages 60a, 60b, 60c and 60d so that the power shafts provide increasing higher rigidity, increasingly higher modulus and increasingly faster rebound to the front face as one moves from power shaft 12d to power shaft 12a. To maintain the total overall weight of each of the power shafts the same, and hence, the overall weight of the clubhead is approximately the same, for all golfers, an annular threaded boss 61 is provided transverse to or radial to the passages 60 in each of the power shafts into which a cylindrical weight 62a, 62b, 62c, or 62e is threaded, each having progressively increasing axial length and weights to compensate for the loss of weight caused by the increasing diameter of the through passages 60a–60d. An integral annular ring 67 is provided on the forward end of each of the power shafts to seat neatly within the forward ring 36. Annular portion 67 has a depth approximately equal to forward ring 36 providing a shoulder 68 that increasing the service area for weldment location between the annular ring 67 and the annular ring 36. Ring 67 has a 3 degree inwardly forwardly tapered outer surface so the shaft can be press fitted into ring 36 which has the same taper on its inner surface. Press fitting can eliminate the need for welding the shafts to the club head. A similar annular portion could be provided at the rear end of the shafts 12a to facilitate welding to rear ring 37 but are not shown in the drawings.

Figure 19:
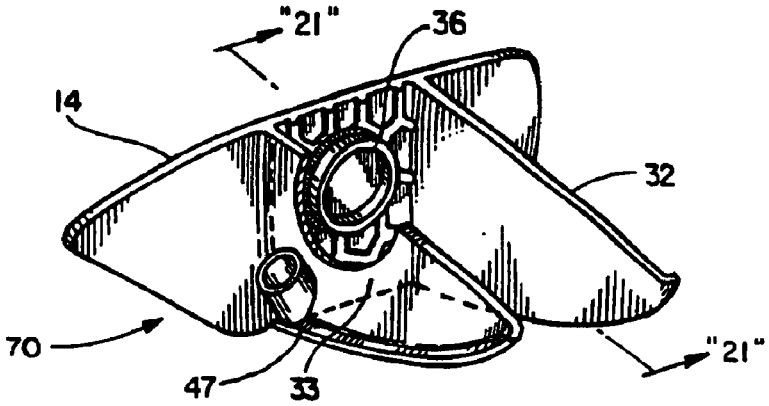
FIG. 19 is a rear perspective of a forward subassembly of the clubhead illustrated in FIGS. 1 to 8 constructed differently than the sub-assemblies illustrated in FIGS. 9, 12 and 13.
Figure 20:
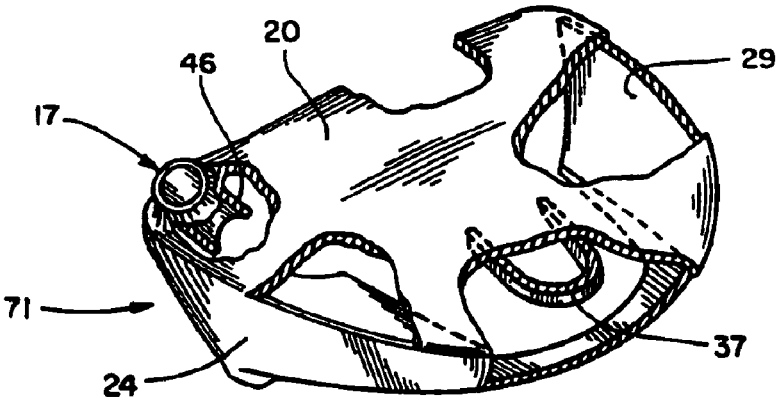
FIG. 20 is a rear perspective of a clubhead rear portion that mates with the forward clubhead sub-assembly illustrated in FIG. 19.
Figure 21:
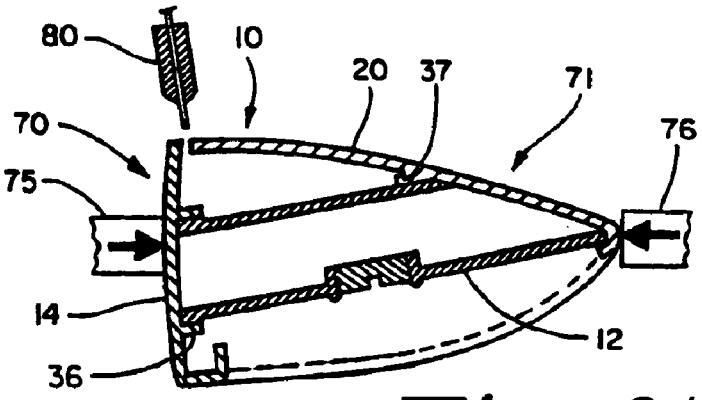
FIG. 21 is a longitudinal section of the subassemblies illustrated in FIGS. 19 and 20 taken generally along line 21—21 of FIG. 19.

A preferred method of manufacturing the present invention is illustrated in FIGS. 19, 20 and 21, and this method is particularly directed to facilitating the insertion of the shaft 12 into the clubhead assembly and to preloading the shaft 12 against the front face 14.

The clubhead 10 is constructed according to FIGS. 19, 20 and 21, in two pieces. The first being the forward piece 70 containing the forward ring 36, and the rear piece 71 containing the rear ring 37. The forward piece 70, which may be cast preferably by investment casing and preferably utilizing the light-weight high surface hardness alloys discussed above, includes the forward face 14, the honeycomb face reinforcement 18, the integral ring 36, the heel weight wall 37 with its annular hosel boss 47 integrally formed therewith, and forward wall 32.

The rear clubhead portion 71 is an integral casting including top wall 20, hosel upper boss 46, rear ring 37 integrally formed underneath the rear portion of top wall 20, toe wall 29, heel wall 24, and a connecting wall portion.

After rough finishing the two castings 70 and 71, they are placed in a jig including a forward component jig 75, and a rear component jig 76 that firstly hold respectively the forward portion 70 of the clubhead and the rear portion 71 of the clubhead, and at the same time direct the two portions toward one another. Shaft 12 is inserted into forward ring 36 and rear ring 37 prior to placement into jig 75, 76. After placement into the jig, the jig moves the forward portion 70 in the direction of rear portion 71. Thereafter, a program welding system 80 welds the front portion 70 to the rear portion 71 connecting the parts together.

I claim:

1. A high impact golf club for compromising perimeter weighting and ball impact force, comprising: a golf clubhead, a shaft connected to the golf clubhead, said golf clubhead including a metallic alloy body having a ball striking face wall, a top wall extending rearwardly from the face wall, a toe wall extending rearwardly from the face wall, a heel wall extending rearwardly from the face wall, a hosel for receiving the shaft extending into the body, all of said walls being substantially thinner in thickness than length to define a perimeter weighted clubhead, and means to increase the rigidity of, to increase the natural frequency of, and to transfer head weight to the ball striking face wall including a narrow power member constructed of a metallic alloy, and extending generally rearwardly therein, said power member being integrally connected to the clubhead at a rear portion thereof and integrally connected at a forward end thereof to the ball striking area of the face wall, an annular retainer formed integrally with and projecting a substantial distance rearwardly from the ball striking face wall, said narrow power member being seated within the retainer, and means to integrally join the forward end of the power shaft to the retainer.

2. A high impact golf club for compromising perimeter weighting and ball impact force as defined in claim 1, wherein a weldment connects the forward end of the power member to the retainer.

3. A high impact golf club for compromising perimeter weighting and ball impact force as defined in claim 1, including a second retainer formed integrally with the rear portion and receiving the power member, said first and second retainers interfering with insertion of the power member therein, said rear portion of the body being formed separately from a front portion including the face wall, and a weldment connecting the rear portion of the body to the front portion after the power member is inserted into the first and second retainers.

4. A high impact golf club for compromising perimeter weighting and ball impact force as defined in claim 3, wherein a first weldment connects the first retainer to the power member and a second weldment connects the second retainer to the power member.

5. A high impact golf club for compromising perimeter weighting and ball impact force as defined in claim 1, wherein the clubhead body weight is in the range of 150 to 180 gms. and the power member is in the range of 10 to 60 gms with a combined weight of less than 210 g.

6. A high impact golf club for compromising perimeter weighting and ball impact force as defined in claim 1, wherein the clubhead body weight is approximately 175 gms. and the power member weight is approximately 25 gms.

7. A line of high impact golf clubs for compromising perimeter weighting and ball impact force that customizes the clubs to the golfer's swing speed, comprising: a plurality of clubs including at least one high swing speed club and one low swing speed club including a plurality of golf clubheads [all having the same size and outer shape], a shaft connected to the golf clubheads, said golf clubheads including a relatively high modulus metallic alloy body having a ball striking face wall, a top wall extending rearwardly from the face wall, a toe wall extending rearwardly from the face wall, a heel wall extending rearwardly from the face wall, a hosel for receiving the shaft extending into the body, all of said walls being substantially thinner in thickness than length to define a perimeter weighted clubhead, and means for changing the rigidity of, and means to increase the frequency of, and to transfer head weight to the ball striking face wall from one club in the line to another club in the line including a plurality of narrow power members one in each of the clubheads for varying swing speeds including first power members to provide a fixed, non-adjustable after assembly high modulus of elasticity face wall for the high swing speed club and second power members to provide a lower fixed, non-adjustable after assembly modulus of elasticity face wall for the lower swing speed club.

8. A line of high impact golf clubs for compromising perimeter weighting and ball impact force, comprising: a plurality of golf clubheads, a shaft connected to the golf clubheads, said golf clubheads including a relatively high modulus metallic alloy body having a ball striking face wall, a top wall extending rearwardly from the face wall, a toe wall extending rearwardly from the face wall, a heel wall extending rearwardly from the face wall, a hosel for receiving the shaft extending into the body, all of said walls being substantially thinner in thickness than length to define a perimeter weighted clubhead, and means to increase the rigidity of, and means to increase the natural frequency of, and to transfer head weight to the ball striking face wall including a plurality of interchangeable before assembly narrow power members for varying swing speeds including first power members to provide a high modulus of elasticity face wall for the high speed swing and second power members to provide a lower modulus of elasticity face wall for the lower speed swing, said first and second power members being annular in configuration and the first power members have a heavier wall thickness than the second power members.

9. A high impact golf club for compromising perimeter weighting and ball impact force, comprising: a golf clubhead, a shaft connected to the golf clubhead, said golf clubhead including a metallic alloy body having a ball striking face wall, a top wall extending rearwardly from the face wall, a toe wall extending rearwardly from the face wall, a heel wall extending rearwardly from the face wall, a hosel for receiving the shaft extending into the body, all of said walls being substantially thinner in thickness than length to define a perimeter weighted clubhead, said ball striking face wall having a ball striking central area, and means to transfer force from the head directly to the ball striking central area including a power member extending rearwardly from the face wall to a rear portion of the clubhead, a retainer for the power member on the face wall behind the ball striking central area, a second retainer for the power member in the rear portion of the clubhead, said first retainer being annular and projecting a substantial distance rearwardly from the face wall, said first and second retainers and the power member being constructed of substantially similar weldable metal alloys, and a weldment between the first retainer and the power member and a weldment between the second retainer and the power member, whereby heat distortion of the face wall and rear portion of the clubhead is minimized.

10. A high impact golf club for compromising perimeter weighting and ball impact force as defined in claim 9, including said first and second retainers being spaced apart a distance less than the length of the power member.

11. A high impact golf club for compromising perimeter weighting and ball impact force, comprising: a golf clubhead, a shaft connected to the golf clubhead, said golf clubhead including a metallic alloy body having a ball striking face wall, a top wall extending rearwardly from the face wall, a toe wall extending rearwardly from the face wall, a heel wall extending rearwardly from the face wall, a hosel for receiving the shaft extending into the body, all of said walls being substantially thinner in thickness than length to define a perimeter weighted clubhead, said ball striking face wall having a ball striking central area, and means to transfer force from the head directly to the ball striking central area including a power member extending rearwardly from the face wall to a rear portion of the clubhead, a retainer for the power member on the face wall behind the ball striking central area, said retainer being annular and formed integrally with the face wall and protecting a substantial distance rearwardly from the face wall, and a second retainer for the power member in a rear portion of the clubhead, the first and second retainers and the power member being constructed of substantially similar weldable metal alloys, and a weldment between the first retainer and the power member and a weldment between the second retainer and the power member, whereby heat distortion of the face wall and rear portion of the clubhead is minimized.

12. A high volume metal alloy clubhead comprising: a clubhead body constructed of a high titanium alloy substantially lighter than ferrous alloys having a weight in the range of 150 to 180 gms, and a volume in the range of 250 to 300 $cm.^3$, said clubhead body being oversized and including at least a face wall, a toe wall, a heel wall, a top wall and a hosel, all being relatively thin compared to their extent, said heel wall, toe wall and top wall all being connected to the front wall at the perimeter of the front wall so the clubhead body is perimeter weighted, and means for transferring a portion of the body weight behind a ball striking area of the face wall including a power member fixed at one end to a rear portion of the body and at its other end to the face wall, the mass of the power member being selected so the total weight of the clubhead is in the range of 190 to 210 gms., whereby the light-weight body enables the clubhead to be oversized while leaving a high percentage of total weight for the power member.

13. A metal alloy clubhead as defined in claim 12, wherein the power member is formed integrally with the face wall at one end and integrally with the rear portion of the clubhead at its other end, said power tube having a weight at least 20 percent of total clubhead weight to concentrate a greater weight directly behind the ball striking area.

14. A line of golf club woods designed for both lower swing speeds in the range of 60 to 85 mph and high swing speeds in the range of 85 to 110 mph, comprising: a plurality of identical clubhead bodies having hosels, a plurality of shafts connectable to the hosels in the bodies to form golf clubs, said clubhead bodies including at least a face wall, a top wall, a toe wall and a heel wall each being relatively thin to their extent, said top wall, toe wall and heel wall being connected to the perimeter of the face wall so the clubhead bodies are perimeter weighted to enlarge the sweet spot and effective hitting area on the face wall, and means to vary the resonant frequency of the face wall to provide higher resonant frequency golf clubs for the higher swing speeds and to provide lower resonant frequency golf clubs for the lower swing speeds including a plurality of interchangeable power members connectable between the rear of the face wall and a rear portion of the clubhead bodies, said power members including power members having a lower thickness for the lower resonant frequency golf clubs and including power members having a relatively higher thickness for the higher resonant frequency golf clubs.

15. A line of golf club woods as defined in claim 14, and means to maintain the weights of the power members substantially constant while varying the natural frequency of the face wall including a plurality of power members, some having relatively thin wall thickness and some having relatively heavy wall thickness, and discrete weight means on the power members to equate the weight of the thin wall thickness power members to the relatively heavy wall thickness power members.

16. A line of golf club woods as defined in claim 14, wherein the clubhead bodies have the same weight in the range of 150 to 180 gms. each.

17. A perimeter weighted wood golf club, comprising: a clubhead including at least a face wall, a top wall, a toe wall, and a heel wall, each of the walls being relatively thin in thickness compared to the extent, said top wall, toe wall and heel wall all connected to the perimeter of the face wall so the clubhead is perimeter weighted, a hosel in the clubhead for receiving a shaft, a shaft in the hosel, and means for reducing the weight of the hosel so the saved weight can be distributed more beneficially in the clubhead including the hosel being defined by a short annular segment in the top wall having an axis coincident with the desired lie of the clubhead, a second short annular segment in a lower portion of the clubhead having an axis coincident with the axis of the first annular segment, said first and second annular segments being spaced apart at least 0.500 inches, and means for bonding the tip end of the shaft in the first and second annular segments including a sleeve surrounding the shaft between the hosel segments, said sleeve being bonded at one end to one hosel segment and bonded at another end to the other hosel segment.

18. A method of fixing a shaft into a golf clubhead having at least a face wall, a top wall, a toe wall, and a heel wall, each of the walls being relatively thin in thickness compared to the extent, said top wall, toe wall and heel wall all connected to the perimeter of the face wall so the clubhead is perimeter weighted, a hosel in the clubhead for receiving a shaft, a shaft in the hosel, and means for reducing the weight of the hosel so the saved weight can be distributed more beneficially in the clubhead including the hosel being defined by a short annular segment in the top wall having an axis coincident with the descend lie of the clubhead, a second short annular segment in a lower portion of the clubhead having an axis coincident with the axis of the first annular segment, said first and second annular segments being spaced apart at least 0.500 inches, including the steps of applying a bonding agent to the tip end of the shaft, and inserting the tip end of the shaft first through the first segment and then into the second segment while rotating and orienting the shaft so the bonding agent is layered on the shaft between the first and second segments so the bonding layer is bonded to both segments and the shaft to reinforce the shaft.

19. A line of golf club woods designed for both lower swing speeds in the range of 60 to 85 mph and high swing speeds in the range of 85 to 110 mph, comprising: a plurality of clubhead bodies having hosels, a plurality of shafts connectable to the hosels in the bodies to form golf clubs, said clubhead bodies including at least a face wall, a top wall, a toe wall and a heel wall each being relatively thin to their extent, said top wall, toe wall and heel wall being connected to the perimeter of the face wall so the clubhead bodies are perimeter weighted to enlarge the sweet spot and effective hitting area on the face wall, and means to vary the resonant frequency of the face wall to provide higher resonant frequency golf clubs for the higher swing speeds and to provide lower resonant frequency golf clubs for the lower swing speeds including a plurality of power member connectable between the rear of the face wall and a rear portion of the clubhead bodies, said power members including power members having a lower frequency for the lower resonant frequency golf clubs and including power members having a relatively higher frequency for the higher resonant frequency golf clubs, and means to maintain the weights of the power members substantially constant while varying the natural frequency of the face wall including a plurality of power members, some having relatively thin wall thickness and some having relatively heavy wall thickness, and discrete weight means on the power members to equate the weight of the thin wall thickness power members to the relatively heavy wall thickness power members, the clubhead bodies having the same weight in the range of 150 to 180 gms. each.

20. A high impact golf club for compromising perimeter weighting and ball impact force, comprising: a golf clubhead, a shaft connected to the golf clubhead, said golf clubhead including a metallic alloy body having a ball striking face wall, a top wall extending rearwardly from the face wall, a toe wall extending rearwardly from the face wall, a heel wall extending rearwardly from the face wall, a hosel for receiving the shaft extending into the body, all of said walls being substantially thinner in thickness than length to define a perimeter weighted clubhead, said face wall having a ball striking area and a rear surface, and means for transferring force from the body to the ball striking area, increasing the naturally frequency of the face wall while maintaining acceptable overall clubhead weight including a power member fixed at one end to the rear surface of the first wall at the ball striking area and fixed at its other end to a rear portion of the clubhead, a weight receptacle on the power member, and a discrete weight connected into the receptacle to adjust overall clubhead weight to the desired value without substantially varying the natural frequency of the face wall.

21. A high impact golf club for compromising perimeter weighting and ball impact force as defined in claim 18, wherein the power member is tubular in configuration, said receptacle on the power member including an annular threaded boss integrally formed with the tubular power member, said discrete weight being generally circular and having outer threads on the power member annular threaded boss.

22. A jumbo metal wood clubhead constructed of a lightweight hard alloy, comprising: a clubhead constructed of a high titanium alloy having a face wall, a top wall, a toe wall and a heel wall, said clubhead having a weight in the range of 150 to 180 g., a hosel projecting upwardly from the clubhead, said clubhead being constructed of a hard metal alloy having a modulus of elasticity substantially less than steel alloys, said clubhead having an outer volume of at least 250 $cm^3$ and wall thickness less than about 0.150 inches, and means to reinforce the face wall including a high titanium alloy power shaft integral with the face wall at one end and integral with a rear portion of the clubhead at its rear end, said power shaft having a weight so the combined weight of the power shaft and club-head is less than 210 g.

23. A line of golf clubs designed to customize the clubs to the players swing speeds, comprising: a plurality of clubs including at least one high swing speed club and one low swing speed club including a plurality of clubhead bodies [all having the same size and outer shape] having hosels and ball striking face walls, a plurality of shafts attached to the hosels in the bodies to form golf clubs, said bodies having a perimeter wall about the face wall, and means to change the characteristics of the clubhead bodies from one clubhead body in the line to another clubhead body in the line depending upon the players swing speed including means to change the modulus of elasticity of the face walls in the line from one clubhead body in the line to another clubhead body in line to provide a fixed, non-adjustable after assembly high modulus of elasticity face wall in some of the clubhead bodies in the line for the higher swing speed player without changing the size or outer shape of the clubhead bodies, and also to provide a relatively lower fixed, non-adjustable after assembly modulus of elasticity face wall in others of the clubhead bodies in the line for the lower swing speed player without changing the size or outer shape of the clubhead bodies.

24. A line of golf clubs as defined in claim 23, wherein the means to vary the modulus of elasticity of the face walls in the line includes a plurality of interchangeable before assembly power members connectable between the rear of the face wall and a rear portion of the clubhead bodies.

25. A line of golf clubs designed to customize the clubs to the players swing speeds, comprising: a plurality of clubs including at least one high swing speed club and one low swing speed club including a plurality of clubhead bodies [all having the size and outer shape] having hosels and ball striking face walls, a plurality of shafts attached to the hosels in the bodies to form golf clubs, said bodies having a perimeter wall about the face wall, and means to change the characteristics of the clubhead bodies from one club in the line to another club in the line depending upon the players swing speed including means to change the stiffness of the face walls in the line to provide a fixed, non-adjustable after assembly high stiffness face wall in some of the clubhead bodies in the line without changing the clubhead body size or outer shape for the higher swing speed player and a relatively lower fixed, non-adjustable after assembly stiffness face wall in others of the clubhead bodies in the line for the lower swing speed player without changing the clubhead body size or outer shape.

26. A line of golf clubs as defined in claim 25, wherein the means to vary the stiffness of the face walls includes means for varying the stiffness of the face wall without changing the weight of the clubhead bodies.

* * * * *